United States Patent [19]

Moncrieff

[11] Patent Number: 5,550,705
[45] Date of Patent: Aug. 27, 1996

[54] ELECTRICAL TERMINAL CONNECTION EMPLOYING PLURAL MATERIALS

[76] Inventor: J. Peter Moncrieff, 408 Mason Rd., Vista, Calif. 92084

[21] Appl. No.: 441,522

[22] Filed: May 15, 1995

[51] Int. Cl.⁶ .............. H01G 4/30; H01G 4/232
[52] U.S. Cl. ............ 361/313; 361/301.4; 361/301.1; 361/321.2; 361/328; 361/309; 257/303; 257/306
[58] Field of Search ............... 361/301.1, 301.4, 361/313, 321.2, 328; 257/303, 306

[56] References Cited

U.S. PATENT DOCUMENTS 3,906,600  9/1975  Rice ............................. 361/305
5,262,920  11/1993  Sakuma et al. ................. 361/313

*Primary Examiner*—Leo P. Picard
*Assistant Examiner*—Anthony Dinkins

[57] ABSTRACT

A structure comprising an electrical component and a terminal for making external electrical connections to the electrical component. The substructure and method for making electrical connection between electrical components and their terminals, providing improved electrical characteristics by the use of a plurality of materials. The composition of the substructure comprises a first material adjacent to the electrical component and a second material adjacent to the first material. The second material melting point is higher than the melting point of the first material.

20 Claims, 4 Drawing Sheets

ELECTRICAL TERMINAL CONNECTION EMPLOYING PLURAL MATERIALS

FIELD OF THE INVENTION

This invention pertains to structures for making electrical connection between electrical components such as capacitors and their terminals.

BACKGROUND OF THE INVENTION

When attaching an electrical terminal to an electrical component such as a capacitor, some structure and method must be employed to form a good mechanical bond between the terminal and the component, and also simultaneously a good electrical connection from the terminal to the electrical elements within the component itself, such as the plates of a capacitor.

If the electrical component and its interior electrical elements can withstand high heat, then direct or semi-direct connections can be made from the terminal to the electrical component, using methods such as welding or soldering. But most capacitors and many other types of electrical components (e.g. thin film resistors) strive for compactness, and so employ interior electrical elements that are thin and fragile, incapable of withstanding high heat. In this case, an intermediary structure is often employed, to make a connection between the electrical component and its terminal.

One such type of intermediary structure is a metal spray. Molten metal is sprayed onto the electrical component at suitable locations, and is allowed to solidify, and the terminal is later attached to this layer of metal that has been sprayed.

A problem has been the composition of this intermediary metal spray structure. There are two primary desiderata for this composition.

First, the material constituting the metal spray should have a low melting point, so that it can be sprayed in molten form onto the electrical component at a relatively low temperature, thereby minimizing the amount of potentially damaging heat inflicted upon the electrical component. A metal spray with a low melting point is further advantageous for later welding or soldering of the terminal to the end spray.

Second, the material constituting the metal spray should also have high conductivity, so as to form a good electrical connection between the terminal and the component.

Unfortunately, these two desiderata tend to be mutually exclusive. Metal materials having a suitably low melting point tend to have the poorest conductivity among metals, while metal materials with the best conductivity tend to have melting points too high to be suitable for molten spraying onto fragile electrical components.

DESCRIPTION OF PRIOR ART

Prior art has commonly employed zinc or tin (or a tin babbitt) as the material of choice for spraying electrical components such as capacitors. Zinc and tin have suitably low melting points, and are relatively inexpensive.

Zinc and tin have poor conductivity among the conductive metals. The resistivity of tin is 7.65 times higher than copper, and the resistivity of zinc is 3.54 times higher than copper.

Prior art has not recognized this higher resistivity as a problem, as evidenced by their continued usage of these materials. Prior art evidently believes that the shortness of the electrical path through the thickness of the end spray, from the terminal to the electrical component, makes it irrelevant that the material employed for this short path has higher resistivity. This belief would be especially applicable to electrical components such as resistors and capacitors, where the interior elements of the electrical components themselves have substantial resistance that swamps whatever resistance the high resistivity end spray adds in series.

However, it has now been experimentally determined and demonstrated that the conductivity characteristics of the end spray material do have a substantial effect upon the performance of the electrical component as a whole, and that superior performance can be realized by providing an end spray that predominantly employs a high conductivity material such as copper, so that the conductivity characteristics of the end spray are predominantly dictated by this high conductivity material.

The challenge then becomes how to provide a structure that can predominantly employ a high conductivity material, while surmounting all the problems that have prevented prior art from using such a material. These problems have included firstly excessive heat, from the high temperature required to achieve a molten state for high conductivity materials. Secondly, it has been problematic to obtain a good mechanical bond to the electrical component; this problem is especially crucial in most capacitors, where the molten spray must be able to adhere to just the thin edge of a plate, which might be just a vapor deposition upon plastic film. Thirdly, it has been problematic to obtain a good electrical connection to the electrical component, especially in most capacitors, where it is important to obtain good electrical connection to all layers of the common extended foil design. These problems have also compounded each other. For example, excessive heat causes the thin edges of metallized plastic film in capacitors to shrink and curl, thereby preventing good electrical connection to all layers of the vapor deposited plate edge.

OBJECTS AND ADVANTAGES

Accordingly, it is an object of the present invention to provide an intermediary substructure, such as a metal end spray, to make a connection between an electrical component, such as a capacitor, and its terminal, where the electrically predominating material of the substructure has superior electrical characteristics, such as high conductivity.

A further object of the present invention is to provide such a substructure that can be employed adjacent to an electrical component such as a plastic film capacitor without causing damage from excessive heat during application.

A further object of the present invention is to provide such a substructure that can adhere well to a thin edge of an electrical component's element, such as the thin edge of a metallized film capacitor's vapor deposited plate.

A further object of the present invention is to provide such a substructure that allows good electrical connection to a thin edge of an electrical component's element, such as the thin edge of a metallized film capacitor's vapor deposited plate.

Further objects and advantages of the present invention will become apparent from a consideration of the drawings and ensuing description of preferred embodiments.

DESCRIPTION OF PREFERRED EMBODIMENTS

Figure 1:
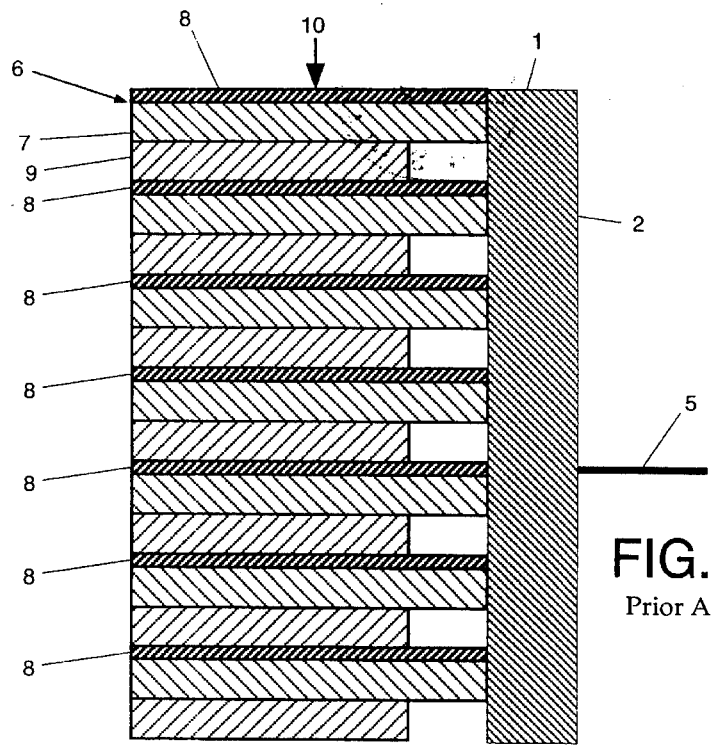
FIGS. 1–2 show embodiments of prior art film capacitor, in cross sectional view.

FIG. 1 shows a detail of a prior art extended foil metallized film capacitor, showing one end in cross sectional view. FIG. 1 shows a plurality of electrode plates 8, each plate 8 consisting of vapor deposited metallization on a plastic film substrate 7. A paired instance of plate 8 and substrate 7 may be also referred to as a metallized substrate 6. A spacer 9 separates one instance of metallized substrate 6 from another instance. In most capacitors spacer 9 comprises an opposite polarity plate and supporting substrate; but in the portion of the capacitor shown as the detail in FIG. 1, only the substrate is normally present, acting only as a spacer, so for clarity this is shown merely as spacer 9.

Elements that are functionally necessary or relevant to the operation of an electrical component such as a capacitor could be said to constitute that electrical component. Thus, plates 8 and dielectric substrates 7 and spacers 9 could be said in aggregate to constitute an electrical component 10, in this case a capacitor. Ancillary elements may then be added outside such an electrical component, for example a terminal for external connections. These ancillary elements are not functionally necessary to the intrinsic operation of the electrical component, for example as a capacitor, but they are useful, for example by making it easy to connect a plurality of plates 8 to an external electrical connection.

FIG. 1 shows a terminal 5, for making external electrical connections to the capacitor. A sprayed metal 1 is adjacent to the edge of each plate 8, and is intermediary between plate or plates 8 and terminal 5. Sprayed metal 1 is normally intermediary both electrically and structurally; that is, it both acts as the electrical connection, between plate or plates 8 and terminal 5, and also acts as the mechanical anchor securing terminal 5 to the edge or edges of plate or plates 8.

In most prior art capacitors of this type, the composition of sprayed metal 1 comprises a single material, and that single material has a relatively low melting point. The common material employed is either tin or zinc. These materials have a low melting point (232 to 420 degrees Celsius). This low melting point is advantageous because the material can be applied in molten form onto the edges of plate or plates 8 without causing excessive heat damage to the plastic film constituting substrate 7. This low melting point is further advantageous because it allows easy connection of terminal 5 to sprayed metal 1, either by soldering, or by direct welding whereby a portion of sprayed metal 1 adjacent to terminal 5 is re-melted in order to adhere to terminal 5.

These common materials for sprayed metal 1, such as tin and zinc, have a relatively high resistivity. Table 1 below shows that their resistivity is much higher than the metals usually employed where good conductivity is required, such as copper, silver, gold, aluminum.

TABLE 1

| Material | Melting Point, Celsius | Resistivity ($\times 10^8$, in ohm · meters) |
| --- | --- | --- |
| Tin | | |
| Zinc | 232 | 12.8 |
| Aluminum | 420 | 5.9 |
| Gold | 660 | 2.7 |
| Copper | 1063 | 2.3 |
| Silver | 1083 | 1.67 |
| | 961 | 1.6 |

Prior art has not recognized the higher resistivity of tin and zinc as a problem, as evidenced by their continued usage of these materials. Prior art evidently believes that the shortness of the electrical path through the thickness of the end spray, from the terminal to the electrical component, makes it irrelevant that the material employed for this short path has higher resistivity. This belief would be especially applicable to electrical components such as resistors and capacitors, where the interior elements of the electrical components themselves have substantial resistance that swamps whatever resistance the high resistivity end spray adds in series.

Figure 2:
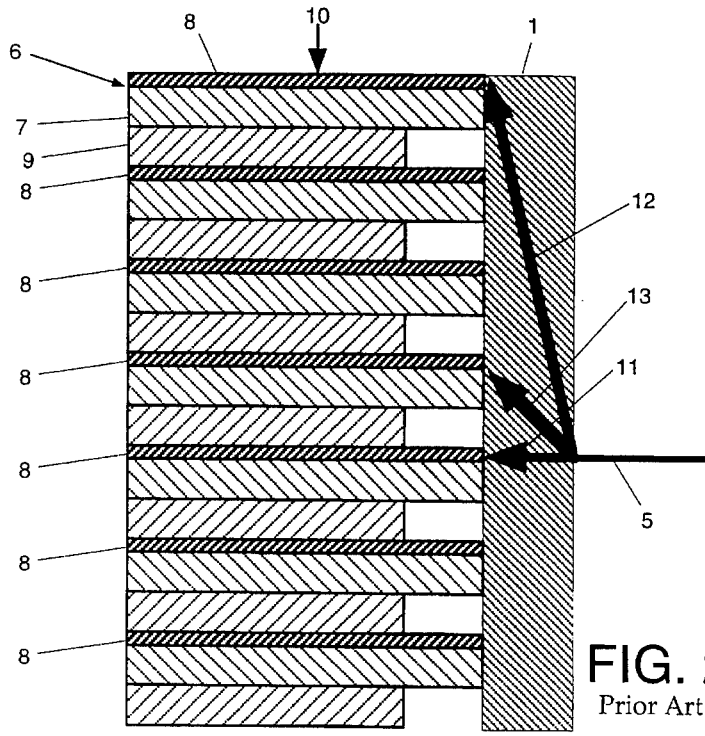

FIG. 2 shows in cross section the same detail as shown in FIG. 1, with the addition of an arrow representing a path 11 and an arrow representing a path 12 and an arrow representing a path 13. Path 11 is one path followed by electric current as it flows into (or out of) the capacitor. Path 11 follows the shortest possible route through intermediary sprayed metal 1, as it travels from terminal 5 to the edge of nearest plate 8. Thus, electric current following path 11 encounters only a short trip through the thickness of sprayed metal 1.

However, there are also other, longer paths that electric current must follow through sprayed metal 1, as it travels from terminal 5 to other edges of other plates 8. Paths such as path 12 do not follow the shortest route through the thickness of sprayed metal 1, as path 11 does, but rather follow a direction substantially perpendicular to path 11. Paths such as path 12 take the electric current on a much longer trip through the material of sprayed metal 1 than do paths such as path 11.

Path 13 follows a 45 degree angle from terminal 5 to its destination at some edge of some plate 8. Path 13 is relatively close to path 11 for most electrical components such as capacitors, since the thickness of sprayed metal 1 is much less than the dimension across the area sprayed by sprayed metal 1. All electrical paths farther from terminal 5 than path 13 are aligned predominantly in the direction of path 12, while all electrical paths closer to terminal 5 than path 13 are aligned predominantly in the direction of path 11. Thus, the vast majority of electrical paths between electrical component 10 and terminal 5 predominantly follow the direction of path 12, and this is the predominant direction of current between electrical component 10 and terminal 5.

Figure 3:
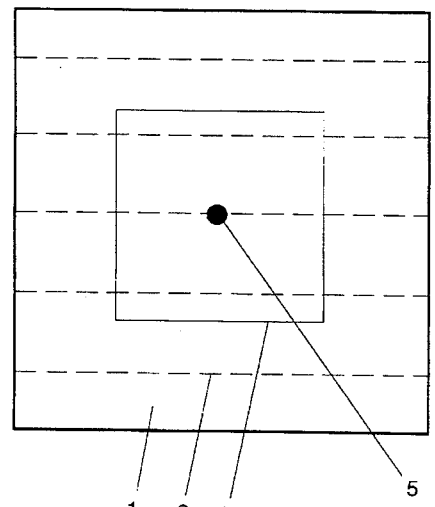
FIG. 3 shows general geometric considerations for a capacitor, in elevation view of one end.

It is also true that, for most electrical components such as capacitors, there are many more longer paths like 12 than there are shorter paths like 11. This is demonstrated by FIG. 3. FIG. 3 shows an elevation view of one face of the capacitor whose detail is shown in FIGS. 1–2, a face to which sprayed metal 1 has been applied. For the sake of convenience, it is assumed that this face is square. A square 14 shows the outline sketched by the mean path length through sprayed metal 1 from terminal 5 to different portions of this face, that is to different plates 8 or different portions of plates 8 (shown as dotted lines since they are hidden behind sprayed metal 1). It can be appreciated that the area outside this square is four times the area within this square. Thus, there are three times as many long paths through sprayed metal 1, exceeding the mean path length, as there are short paths through sprayed metal 1, which are shorter than the mean path length.

This means that the quality of the capacitor's performance as a whole is predominantly dictated by the quality of the longer paths, and that in turn makes problematic the use of inferior conductor materials such as tin and zinc for sprayed metal 1.

One problem is simply the increased resistance the electric current experiences when it travels all the longer paths such as path 12 through a higher resistivity material. This can raise the ESR (equivalent series resistance) of a capacitor to undesirably high levels for some critical applications. Higher resistivity materials also cause a greater resistance differential between short paths such as path 11 and long paths such as path 12 within one capacitor. This defeats some of the intended advantages of extended foil design, which is supposed to feed all plate layers of a capacitor equally from sprayed metal 1. A lower resistivity material would exhibit less resistance differential, allowing the extended foil design to function more ideally as intended.

Increased resistance causes linear losses in the electric current, or in the changing signal representing the electrical charging and discharging of the capacitor. There are also problems with nonlinear losses when an electric current, especially a changing electric current, travels through a material that is an inferior conductor. The material's crystal lattice structure, imperfections in that structure, and foreign impurities in the material can be factors causing nonlinearities (distortion) in the electric current within the material and in the electromagnetic wave's field propagating just outside the material. Inferior conductor materials can be intrinsically worse in these nonlinear factors than superior conductor materials such as copper and silver. Moreover, even if the nonlinear factors were the same, the greater linear losses of the inferior conductor cause a greater percentage voltage drop through the length of path 12 than the smaller linear losses of a superior conductor would, thereby magnifying the percentage impact on the overall electric current of whatever nonlinear factors there are in the material of sprayed metal 1, this magnification being in proportion to the greater resistivity of the inferior material over the superior material.

Thus, it is advantageous to employ a material with low resistivity for sprayed metal 1, a material such as copper (gold or silver are also advantageous, but they are expensive). Advantages of a low resistivity material include lower ESR, significantly lower resistance for longer paths such as path 12, lower resistance differential, lower linear losses, lower nonlinear distortion, and lower magnification of whatever nonlinear factors exist.

However, advantageous low resistivity materials such as copper have the disadvantage of having a high melting point temperature. This can be seen in Table 1. The melting point of copper is 4.7 times higher than tin, even while its conductivity is 7.7 times higher. Thus, one pays for higher conductivity (lower resistivity) with a higher melting point. Likewise, the melting point of copper is 2.6 times higher than zinc, even while its conductivity is 3.5 times higher.

A material with a high melting point has been problematic for spraying in molten form directly onto certain kinds of electrical components that are heat sensitive, such as plastic film capacitors. The high temperature of the molten spray could impart enough heat to plastic film substrate 7 to significantly alter its shape at its delicate edge, if the molten spray hits this delicate edge directly. This shape alteration could prevent sprayed metal 1 from making electrical and mechanical contact with all appropriate edges of all layers of plate or plates 8 in the capacitor. It is advantageous in an extended foil capacitor design that the metal spray make good electrical contact with all such edges of all such layers of all such plates. Advantages include lower ESR, lower inductance, better simultaneity of electrical current, and better accuracy in tracking electrical charging and discharging changes.

Because of such problems spraying molten metal at high temperatures directly onto heat sensitive electrical components, prior art has avoided the use of materials for spraying that have a high melting point, and thereby has precluded the employment of those materials having superior conductivity such as copper.

The present invention offers a solution to this problem by teaching a substructure which allows a material such as copper, having superior conductivity but a high melting point, to be sprayed indirectly onto a heat sensitive part rather than directly. This is made possible by a substructure comprising two types of materials. The first type of material has a lower melting point, and could safely be sprayed directly onto heat sensitive elements of an electrical component, such as the delicate edges of a capacitor's plastic film substrate. The second type has a higher melting point, and is thus able to be superior in conductivity. The first material, after solidifying and cooling, forms a protective layer preventing the hotter second material from touching the delicate edges of the plastic film substrate, and also could act as a heat sink for dissipating the heat imparted by the hotter second material molten spray. An object of the present invention is that the second material could be deposited or employed in the substructure in sufficient quantity, relative to the first material, so that the electrical characteristics of the second material predominate over those of the first material, for electric current travelling through the substructure, between the terminal and the electrical component.

Figure 4:
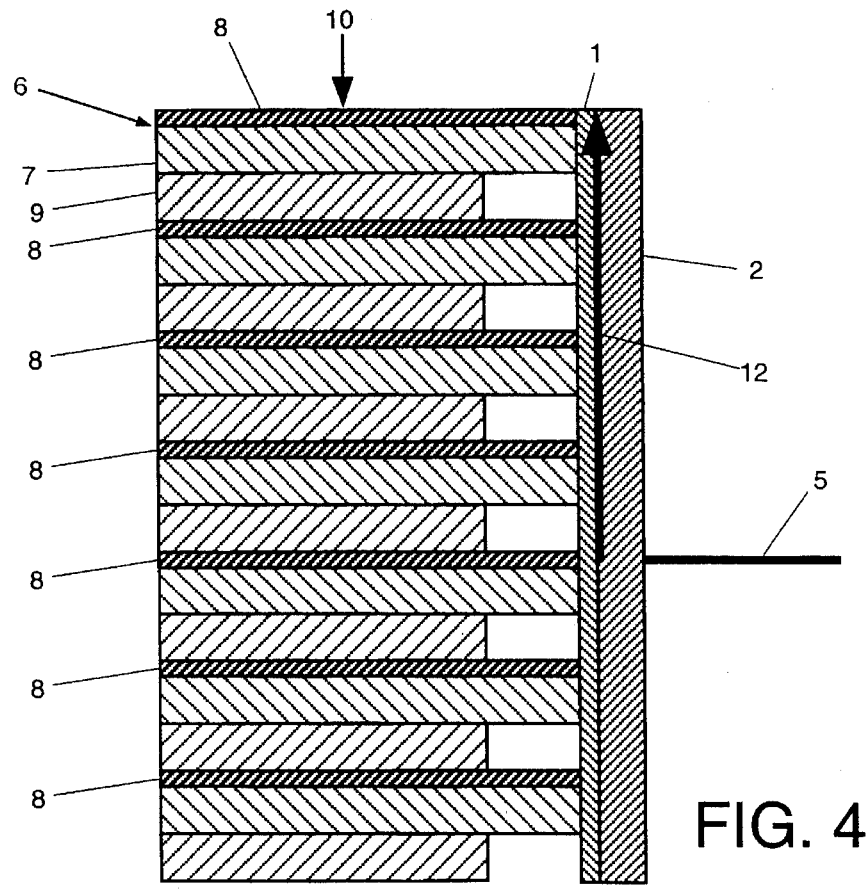
FIGS. 4–9 show various embodiments of the present invention for a capacitor, in cross sectional view.

FIG. 4 shows a detail of an extended foil metallized film capacitor, in cross sectional view, employing a substructure in accordance with the present invention. FIG. 4 is similar to FIGS. 1–2 showing prior art, and thus highlights the distinctions of the present invention over prior art. In FIG. 4 there are two layers of sprayed metal, sprayed metal 1 adjacent to the electrical component's elements (in this case plates 8), and a second sprayed metal 2.

Sprayed metal 1 and sprayed metal 2 together constitute or contribute to a substructure that is electrically intermediary between electrical component 10 and its terminal 5. In FIG. 4, sprayed metal 1 and sprayed metal 2 are both shown as being intermediary, and they are intermediary both electrically and structurally. That is, both sprayed metals act as the electrical connection, between plate or plates 8 and terminal 5, and both also act as the mechanical anchor securing terminal 5 to the edge or edges of plate or plates 8. However, it is understood that alternative embodiments of the present invention could encompass either or both of sprayed metals 1,2 not being electrically intermediate and/or not being structurally intermediary. An apparatus or method would be in accordance with the present invention so long as some part of the substructure claimed by the present invention is electrically intermediary between an electrical component and its terminal—and this electrically intermediary part of the substructure could be some part other than sprayed metal 1 or sprayed metal 2, since the substructure comprises two conductive materials (here sprayed metal 1 and sprayed metal 2), but might also comprise further conductive elements as well.

Sprayed metal 1 is structurally adjacent to electrical component 10, i.e. it is physically adjacent to some portion of electrical component 10.

Sprayed metal 2 has a melting point higher than sprayed metal 1. Thus, sprayed metal 1 acts as a thermal emissary for sprayed metal 2. Sprayed metal 2 is presumably (though not necessarily) the material with the superior electrical characteristics, but in view of its higher melting point it is thermally more hostile to the electrical component (here the edges of metallized substrate 6) than sprayed metal 1 is. Sprayed metal 1 makes the direct contact, structurally and thermally, with the electrical component, so that sprayed metal 2 does not have to.

An object of the present invention's embodiment as shown in FIG. 4 is that the electrical characteristics of the sprayed metal 2 could predominate over those of sprayed metal 1, for electric current travelling through the substructure, between terminal 5 and electrical component 10.

As has been demonstrated above in FIG. 2, electrical paths such as path 12 predominate over electrical paths such as path 11, and the predominant amount of electric current between terminal 5 and electrical component 10 flows substantially in the direction of path 12, not the direction of path 11.

In FIG. 4, the electric current travelling in the general direction of path 12 could travel predominantly through sprayed metal 1 or through sprayed metal 2, since both routes are substantially in parallel for an electric current travelling in the general direction of path 12. The predominant amount of current will flow through whichever of the two offers the lesser resistance in the general direction of path 12. The resistance offered by sprayed metal 1 (or by sprayed metal 2) is inversely proportional to sprayed metal 1's resistivity, and is also inversely proportional to the thickness of sprayed metal 1 in a direction substantially perpendicular to the general direction of path 12.

Thus, if sprayed metal 1 and sprayed metal 2 were to have the same resistivity, the predominant amount of electric current following paths like path 12 would flow in sprayed metal 2 instead of sprayed metal 1 so long as the thickness of sprayed metal 2 were greater than the thickness of sprayed metal 1, the thickness being a dimension in a direction substantially perpendicular to this electric current's path or flow. When the predominant amount of current flows in sprayed metal 2 instead of sprayed metal 1, then the electrical characteristics of sprayed metal 2 predominate over those of sprayed metal 1 in affecting the electric current, in keeping with an object of the present invention. The crystal structure, impurities, and other factors determining various aspects of electrical performance (e.g. nonlinear distortion) would predominantly be those of sprayed metal 2 and not sprayed metal 1, since the electrical current predominantly travels through sprayed metal 2. Thus, sprayed metal 2 could be a material selected for superior electrical performance in these various aspects (lower resistivity perhaps being among them), without its high melting point being a problem as it has been for prior art.

It could be further advantageous for the electrical characteristics of sprayed metal 2 to predominate over those of sprayed metal 1 by a wide margin, for example a ratio exceeding 2 to 1. If both sprayed metals were to have the same resistivity, this further advantage could be achieved by making the thickness of sprayed metal 2 more than twice as great as the thickness of sprayed metal 1.

In practice it is likely that sprayed metal 1 would not have the same resistivity as sprayed metal 2. It is further likely that the resistivity of sprayed metal 1 would be higher than that of sprayed metal 2, since sprayed metal 1 has a lower melting point, and metals with a lower melting point tend to have a higher resistivity, as shown in Table 1.

If sprayed metal 1 has a higher resistivity than sprayed metal 2, then sprayed metal 2 does not have to be thicker than sprayed metal 1 (in a direction perpendicular to path 12), in order to offer lower resistance to path 12 than sprayed metal 1 does. Sprayed metal 2 could have less thickness than sprayed metal 1, in direct proportion to how much lower its resistivity is than sprayed metal 1, while still offering the same resistance to path 12 as sprayed metal 1. Thus, in order for the electrical characteristics of sprayed metal 2 to predominate, in accordance with an object of the present invention, it is sufficient that the ratio of the thickness of sprayed metal 2 to sprayed metal 1 be greater than the ratio of the resistivity of sprayed metal 2 to sprayed metal 1. This is the same as saying that the ratio of the thickness of sprayed metal 1 to sprayed metal 2 be less than the ratio of the resistivity of sprayed metal 1 to spray metal 2 (this is the format used in the claims, where the first material is presented first for the sake of clarity). For example, if the resistivity of sprayed metal 1 is twice that of sprayed metal 2, then it is sufficient that the thickness of sprayed metal 1 be less than twice that of sprayed metal 2, in order for the electrical characteristics of sprayed metal 2 to predominate for paths such as path 12.

Thus, it could be said that a first material, sprayed metal 1, is employed in a predetermined first form having a predetermined first amount of material and a predetermined first set of dimensions, and a second material, sprayed metal 2, is employed in a predetermined second form having a predetermined second amount of material and a predetermined second set of dimensions, with the first amount of material and the first set of dimensions being related to the second amount of material and the second set of dimensions such that the electrical resistance, through the second form employing the second material, for a given length in at least one direction (e.g. the direction of path 12), is less than the electrical resistance, through the first form employing the first material, for the given length in this same direction.

It could also be said that the thickness of the first material in a first direction perpendicular to a second direction of electrical current and the thickness of the second material in this same first direction, are related such that the ratio of the first thickness to the second thickness is less than the ratio of the resistivity of the first material to the resistivity of the second material.

It could be further advantageous for the electrical characteristics of sprayed metal 2 to predominate over those of sprayed metal 1 by a wide margin, for example a ratio exceeding 2 to 1. This could be achieved by making the ratio of the thickness of sprayed metal 1 to sprayed metal 2 be less than half the ratio of the resistivity of sprayed metal 1 to sprayed metal 2.

Figure 5:
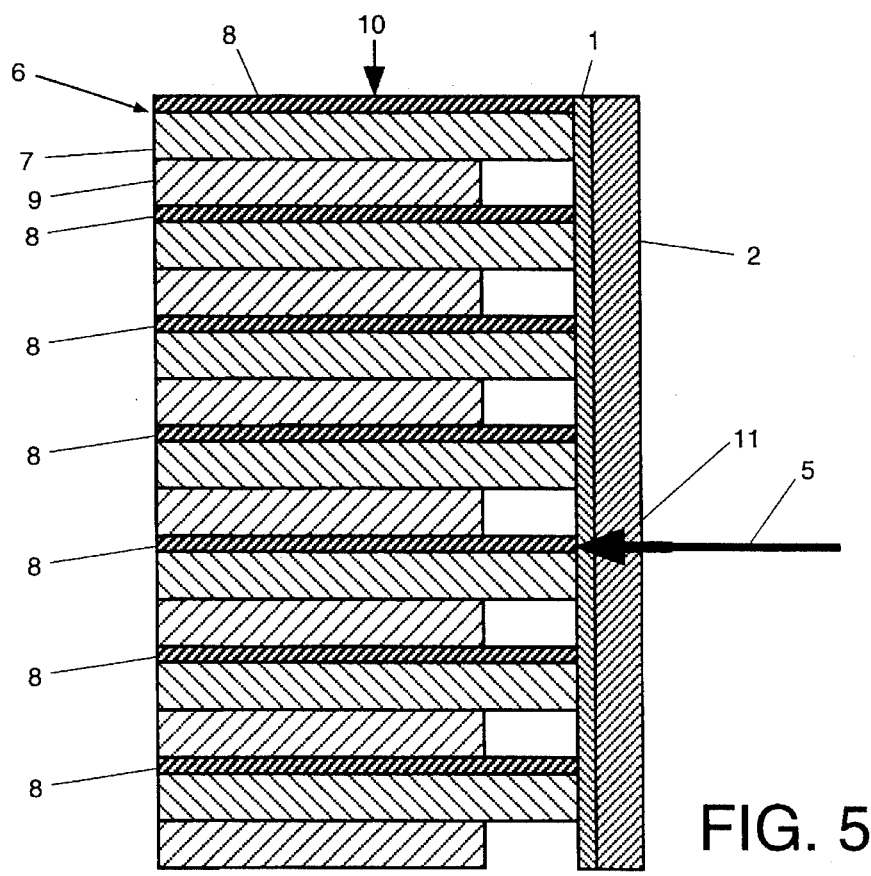

FIG. 5 shows the same structure as FIG. 4, but highlights electrical path 11 instead of path 12. The considerations for paths such as path 11 are somewhat different than those for paths such as path 12. The considerations for path 12 predominate, as demonstrated above, but the considerations for path 11 should nevertheless be understood, and allowed for if appropriate.

For the minority of electrical current following paths such as path 11 rather than paths such as path 12, sprayed metals 1 and 2 are in series, rather being in parallel as they were for path 12. Thus, for some electrical characteristics, if it is desirable for the electrical characteristics of sprayed metal 2 to predominate over sprayed metal 1, then sprayed metal 2 should have a higher resistance along series path 11 than sprayed metal 1, so there is more of a voltage drop in the portion of series path 11 through sprayed metal 2 than in the portion of series path 11 through sprayed metal 1. For example, since some nonlinear factors are magnified by the linear voltage drop through a material, and if some nonlinear characteristics of sprayed metal 2 are different from and advantageous over the nonlinear characteristics of sprayed metal 2, then in order to have the nonlinear factors of sprayed metal 2 predominate over sprayed metal 1 it might be advantageous to have the linear resistance for path 11 be higher in sprayed metal 2 than in sprayed metal 1. This could be achieved by making the ratio of the thickness of sprayed metal 1 to sprayed metal 2 be less than the ratio of the resistivity of sprayed metal 2 to sprayed metal 1.

This consideration for path 11 has the same tendency as the consideration for path 12. Both restrict the thickness of sprayed metal 1 to be less than some ratio. Thus, the considerations for path 11 and path 12 are mutually consistent. This consideration for path 11, for some electrical characteristics, would typically be a stricter restriction than the consideration for path 12, since it says that the ratio of the thickness of sprayed metal 1 to sprayed metal 2 should be less than the inverse of the ratio of their resistivities, and typically this would be a fraction less than 1, since sprayed metal 1 would typically have a higher resistivity than sprayed metal 2. For example, if sprayed metal 1 were aluminum and sprayed metal 2 were copper, then the ratio of resistivity (sprayed metal 1 to 2) would be 1.6. The consideration for path 12 would restrict the thickness of the sprayed aluminum to being less than 1.6 times the thickness of the sprayed copper, while the consideration for path 11, for some electrical characteristics, would restrict the thickness of sprayed aluminum more strictly, to being less than 0.625 times (1/1.6=0.625) the thickness of the sprayed copper.

There are other electrical characteristics for which the consideration for path 11 can be less strict than that for path 12. For example, if linear admittance is the electrical characteristic most advantageous to optimize for a certain application, then it would be advantageous to have less thickness of higher resistivity sprayed metal 1 in the series path 11, but also advantageous to have less thickness of lower resistivity sprayed metal 2 in the series path 11, without concern for the ratio between the two thicknesses, since series resistances add, however small they are, and the smaller they are the better for admittance. Thus, the consideration for series path 11 for this electrical characteristic would not impose any restriction on the ratios of thicknesses. On the other hand, the consideration for parallel path 12 for this same electrical characteristic would retain the requirement that, for the admittance of sprayed metal 2 to predominate, the ratio of the thickness of sprayed metal 1 to sprayed metal 2 should be less than the ratio of the resistivity of sprayed metal 1 to sprayed metal 2.

Thus, the consideration for path 11 can vary widely, from very strict to very loose, depending on the application and consequently the electrical characteristics of concern. On the other hand, the consideration for path 12 can remain constant and predictable, across many applications and electrical characteristics.

It therefore becomes relevant to enquire which of the many electrical paths, between terminal 5 and electrical component 10, are predominantly like path 12 with respect to these considerations, and which are predominantly like path 11. These considerations differ for path 12 and path 11 because path 12 offers parallel routes, predominantly utilizing either sprayed metal 1 or sprayed metal 2 or both in parallel—while path 11 offers only a series route utilizing both sprayed metal 1 and sprayed metal 2 in series. Thus, the deciding factor for any given electrical path is whether it offers predominantly a parallel route or predominantly a series route through sprayed metals 1 and 2. This depends on whether the direction of a given path is more aligned with the direction of path 11, or more aligned with the substantially perpendicular path 12. As shown in FIG. 2, the transition point between the two is defined by path 13, which is aligned substantially at 45 degrees from both paths 11 and 12. As demonstrated by FIG. 2, path 13 lies much closer to path 11 than to path 12, for a typical electrical component where the thickness of sprayed metal is much less than the dimension across a sprayed face or area of the electrical component. Thus, there are many times more electrical paths, between terminal 5 and electrical component 10, that are predominantly aligned in the direction of path 12 than are predominantly aligned in the direction of path 11.

Therefore, the vast majority of electrical paths obey the considerations for parallel path 12, not series path 11. An object of the present invention is to make the electrical characteristics of sprayed metal 2 predominate over the electrical characteristics of sprayed metal 1. This could usually be achieved by designing sprayed metals 1 and 2 to meet the considerations for path 12, while ignoring the considerations for path 11, since paths like path 12 vastly predominate over paths like path 11. The consideration to be met for path 12 is that the ratio of the thickness of sprayed metal 1 to sprayed metal 2 should be less than the ratio of the resistivity of sprayed metal 1 to sprayed metal 2. If this consideration is met, then usually this object of the present invention could be achieved, that the electrical characteristics of sprayed metal 2 predominate over the electrical characteristics of sprayed metal 1.

Alternatively, it might be advantageous or wise to provide an extra margin of predominance of the electrical characteristics of sprayed metal 2 over the electrical characteristics of sprayed metal 1, or to insure that sprayed metal 2 predominates for all electrical paths including path 11. The consideration to be met for path 11, for some electrical characteristics, is that the ratio of the thickness of sprayed metal 1 to sprayed metal 2 should be less than the inverse of the ratio of the resistivity of sprayed metal 1 to sprayed metal 2. Typically, this consideration would also provide an extra margin of predominance of the electrical characteristics of sprayed metal 2 over the electrical characteristics of sprayed metal 1, thus accomplishing both these alternative desiderata.

It could also be feasible to use a handy rule of thumb when designing sprayed metals 1 and 2, to provide an extra margin of predominance, or to insure that sprayed metal 2 also predominates for most if not all paths like path 11. For example, such a rule of thumb could be to calculate the thickness of sprayed metal 2 required to meet the consideration for path 12, and then simply double that thickness. Following this rule of thumb, the ratio of the thickness of sprayed metal 1 to sprayed metal 2 should be less than half the ratio of the resistivity of sprayed metal 1 to sprayed metal 2—or, the resistance in at least one direction through sprayed metal 2 should be less than half the resistance in that same direction through sprayed metal 1.

The above considerations tend toward a design in which sprayed metal 1 is thin and sprayed metal 2 is relatively thick. However, there is a potential disadvantage if sprayed metal 2 is made too thick. As demonstrated above, electric current flows predominantly in the direction of path 12. For all such electric current, the thickness dimension of sprayed metal 2 is perpendicular to the direction of current flow, and acts like the thickness of any long conductor carrying current in the direction of its length dimension. For all such conductors excessive thickness could discriminate deleteriously against the higher frequencies of interest being carried by the conductor, because of skin effect. The thicker a conductor, the more severe is the skin effect's discrimination against a given high frequency of interest. Thus, if the electrical component is to handle high frequencies effectively, it is important to not make sprayed metal 2 be too thick, for the highest frequency of interest. This sets an upper bound on the advisable thickness of sprayed metal 2.

The above considerations set an upper bound on the thickness of sprayed metal 1 in relation to the thickness of sprayed metal 2. If the thickness of sprayed metal 2 is itself constrained by an advisable upper limit due to skin effect, then the thickness of sprayed metal 1 might as a consequence be constrained to be very thin indeed, in order to take full advantage of the teachings of the present invention.

The present invention encompasses substructures where the material of sprayed metal 1 is tin or zinc, with the material for sprayed metal 2 having a higher melting point. But it can be problematic getting good adhesion and good electrical contact if a very thin coat is sprayed, especially if the material being sprayed (tin or zinc) is dissimilar to the material being contacted in electrical component 10, in this case the material of vapor deposited plate 8, which is usually aluminum.

Accordingly, it is a further feature of the present invention that the material of sprayed metal 1 could advantageously be substantially the same material as the material within the electrical component to which sprayed metal 1 is adjacent, or be a material having a similar or complementary internal (molecular and/or atomic) structure. For example, a similar atomic structure could have the same number of valence electrons; a similar molecular structure could have similar molecular weight or similar dipole moment or similar interstices. Complementary internal structures would be those that have a tendency to bond to one another, perhaps also sharing electrons and thereby promoting good electrical contact.

Even a very thin coat of sprayed metal 1 could provide good adhesion and good electrical contact, if it is substantially the same material, or a material with similar internal structure. One reason for this is that the same material can adhere better, since it has the same internal structure; this is especially important where the spray must adhere to just the thin edge of vapor deposited plate 8. A second reason is that the same material can provide better homogeneity of electrical performance, since it has the same crystal lattice structure and the same number of valence electrons; this too is especially important where the spray must provide a homogenous electrical path to just the thin edge of vapor deposited plate 8. Once this same first material is in place, and has secured a good mechanical adherence and electrical connection to just the thin edges of plate 8, then this first material advantageously provides a much broader area for the perhaps dissimilar second material to adhere to and make electrical contact with, as well as providing a dissipative heat sink for the thermal impact of the higher melting point second material.

The plates of a metallized capacitor are often made from a thin vapor deposited layer of aluminum, so it could be advantageous to employ aluminum as the material of sprayed metal 1 for such capacitors. Table 1 shows that the melting point of aluminum is significantly lower than copper, gold, or silver. Thus, it might be thermally feasible to employ aluminum for sprayed metal 1, in circumstances where the superior electrical characteristics of copper, gold, or silver are desired, but it is not thermally feasible to spray these directly onto an electrical component due to their melting points being even higher than aluminum's. Although aluminum's melting point is higher than that of tin or zinc, its thermal impact could be ameliorated by the fact that a very thin coat can be sprayed, yet good adhesion and electrical contact can be obtained, thanks to the fact that it is the same material as vapor deposited plate 8. The feasibility of a very thin coat ameliorates thermal impact because, when spray equipment is adjusted to apply a thinner coat, thermal heat transfer (both convective and conductive) is lessened.

It can be appreciated that all features of the present invention work synergistically together, hand in glove, to solve all the problems facing prior art, and to allow all factors to be mutually supportive and mutually optimizable, rather than working at cross purposes. For optimum electrical performance, the electrical characteristics of sprayed metal 2 with its higher melting point should predominate. For optimum high frequency performance of predominating sprayed metal 2, its thickness should be restricted, which means restricting the thickness of sprayed metal 1 to a thin coat. If the material of sprayed metal 1 is made the same as the adjacent material in the electrical component, then dual advantages simultaneously obtain: better adhesion and electrical contact can be provided by a thin coat, and a higher melting point material than tin or zinc can be employed since its thermal impact is lessened by a thin coat. Thus, in accordance with the present invention, the restriction of sprayed metal 1 to a thin coat could be turned to advantage instead of being an adverse factor. With capacitors employing aluminum plates, aluminum could be used or sprayed metal 1 despite having a higher melting point than tin or zinc, because its thermal impact is lessened by spraying only a thin coat, because a thin coat adheres and contacts well since it is the same material, and because a thin coat allows sprayed metal 2 to be relatively thin, thereby optimizing its high frequency performance.

It is understood that the thickness of sprayed metal 1 might represent an accumulation of several layers of material, sprayed in more than one pass by spray equipment; likewise for sprayed metal 2. Multiple passes, with a thin layer deposition on each pass, can further lessen the thermal impact upon the electrical component.

Figure 6:
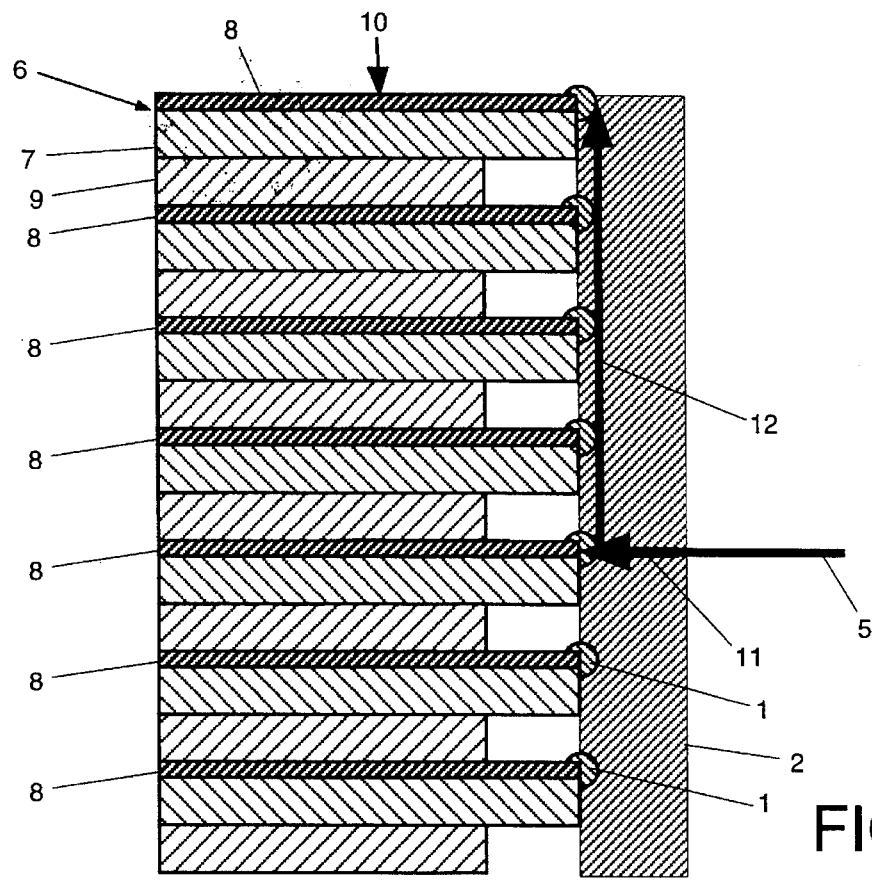

In some applications, it could be advantageous to make sprayed metal 1 extremely thin. It could be made so thin that it is discontinuous, translucent, transparent, or even virtually invisible. FIG. 6 shows how a very thin dusting of sprayed metal 1 could cling only to the thin edges of vapor deposited plates 8, and could be virtually absent where dielectric substrates 7 and spacers 9 are located. It could even be feasible for only some portions of each of the thin edges of plates 8 to be covered by sprayed metal 1; this partial covering could still furnish adequate electrical connection through the material of sprayed metal 1 to each of plates 8.

Since dielectric substrates 7 and spacers 9 occupy the vast majority of the component's volume (and of its surface area front any viewing angle), it can be appreciated that a thin dusting of sprayed metal 1 on the edges of plates 8 might be virtually invisible, and might seem to be a transparent layer. For example, an end view of the capacitor axial with terminal 5 might see the edges of the thick plastic layers of dielectric substrates 7 and spacers 9 transparently revealed, and since they dominate the viewed area, sprayed metal 1 might be virtually invisible.

Sprayed metal 2 could subsequently be applied, in sufficient thickness to form a continuous bridge from terminal 5 to all edges of vapor deposited plates 8, with their thin coating of sprayed metal 1. This extremely thin coating of sprayed metal 1 on each edge of vapor deposited plates 8 could be sufficient to advantageously act as a local heat sink for the application of sprayed metal 2, and/or as a larger area adhesion foothold for it (probably with a rougher surface as well), and as a good electrical contact for it. Again, these advantages might be further enhanced if the material of sprayed metal 1 is substantially the same as or similar to the material of which vapor deposited plates 8 are made (e.g. aluminum). It can be appreciated that, in an embodiment such as shown in FIG. 6, the material of sprayed metal 2 totally predominates over the material of sprayed metal 1, for all paths except path 11, since sprayed metal 1 does not even furnish a continuous path to any other edge of a vapor deposited plate 8. It can further be appreciated that, in an embodiment such as shown in FIG. 6, in at least one direction, such as the direction of path 12, the electrical resistance through sprayed metal 2 is less than the electrical resistance through sprayed metal 1, since sprayed metal 1 is discontinuous in this direction, so its resistance in this direction, to reach most vapor deposited plates 8, is infinite.

Figure 7:
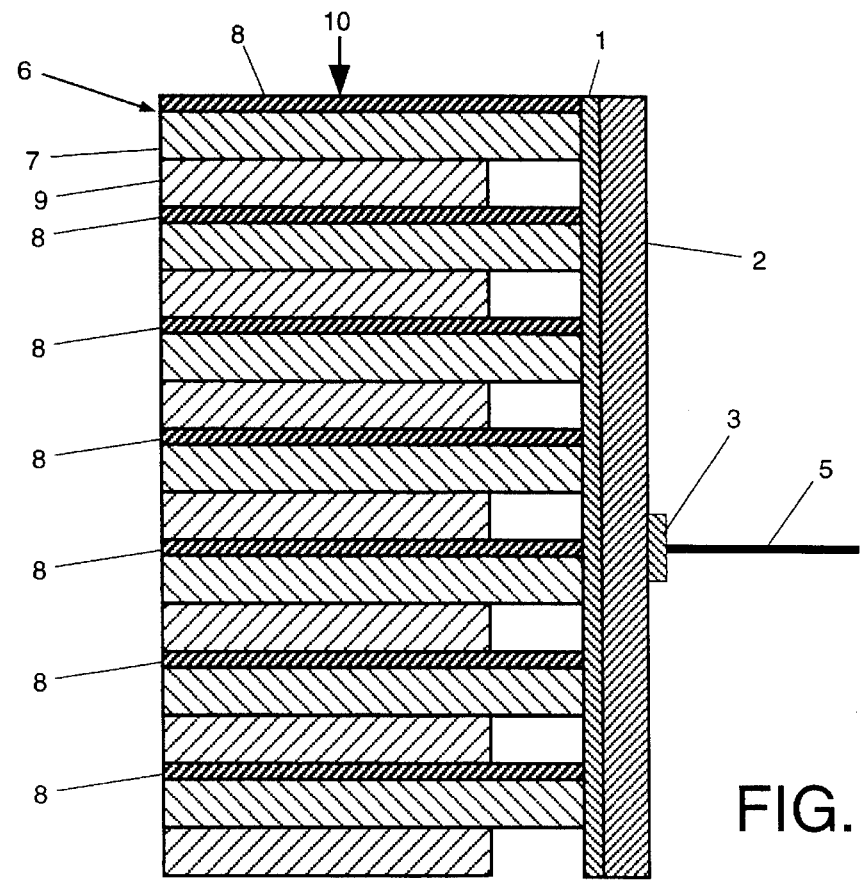
Figure 8:
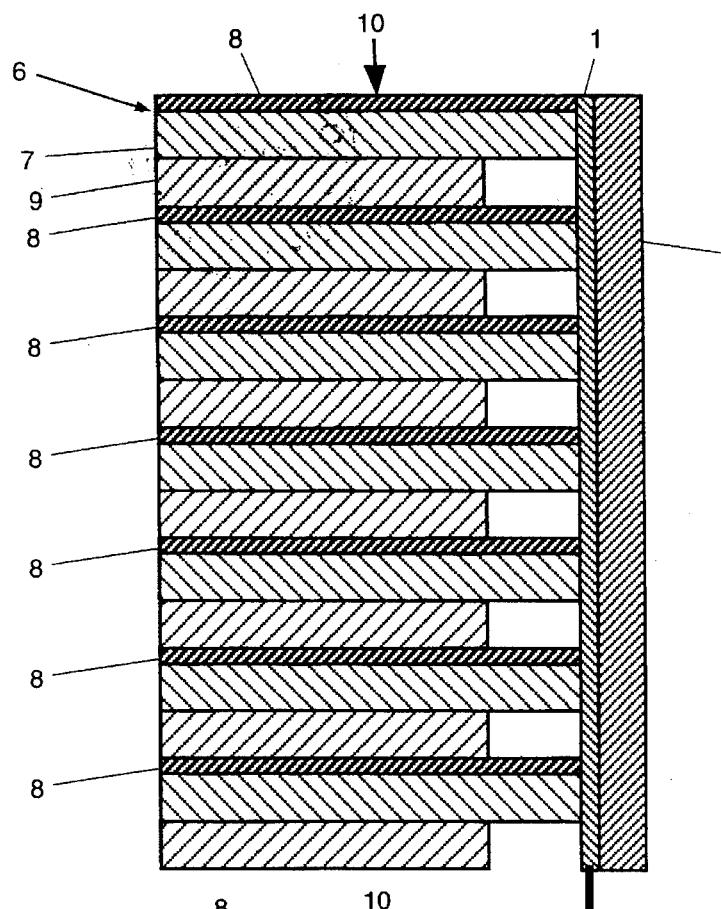

FIG. 8 shows an alternative embodiment of the present invention. FIG. 7 is similar to FIGS. 4–5, but adds a third conductive layer 3 to the intermediary substructure of the present invention. In the FIG. 7 example, layer 3 is both structurally and electrically intermediary between sprayed metal 2 and terminal 5. Layer 3 might be a spot of solder, used to solder terminal 5 to sprayed metal 2. The present invention does not impose any limitations on additional elements of the substructure beyond the two basic elements: a first material structurally adjacent to the electrical component, and a second material having a higher melting point than the first material and being adjacent to the first material.

The second material does not necessarily have to be intermediary between the first material and the terminal, either structurally intermediary or electrically intermediary. FIG. 8 shows another possible alternative embodiment of the present invention. FIG. 8 is similar to FIGS. 4–5, except that terminal 5 contacts sprayed metal 1 directly, and thus sprayed metal 2 is not intermediary between terminal 5 and electrical component 1, either structurally or electrically. Nevertheless, sprayed metal 2 in FIG. 8 could be advantageous in securing an object of the present invention. As discussed above for FIGS. 4–5, for the predominant electric current paths like path 12, the current can flow in parallel through either sprayed metal 1 or 2, or both, predominantly choosing the path of lesser resistance. If sprayed metal 2 is a lower resistance route than sprayed metal 1 for current following paths like path 12, then the predominant current from terminal 5 would go into sprayed metal 1, then sideways into sprayed metal 2, making the majority of its journey within sprayed metal 2. Thus, the electrical characteristics of sprayed metal 2 would predominate over sprayed metal 1 in affecting the current, in accordance with an object of the present invention. As before, sprayed metal 2 could advantageously be a material having high conductivity and other superior electrical characteristics, and the electrical component could benefit from this under the present invention, despite the fact that sprayed metal 2's melting point would typically be very high, too high to be sprayed directly onto the electrical component.

FIG. 8 shows that the indirect application of sprayed metal 2 could be advantageous even if done after the fact. Electrical component 10 in FIG. 8 could have been equipped with terminal 5, and with sprayed metal 1 being the only intermediary between the two. This structure could have been manufactured and sold as a finished product. This finished product could later have its performance advantageously improved by adding sprayed metal 2 on the outside of the previously finished product, without sprayed metal 2 being intermediary, either structurally or electrically, between terminal 5 and electrical component 10. If sprayed metal 2 had a higher melting point than sprayed metal 1, and if it were applied in sufficient thickness so that its electrical characteristics predominated over those of sprayed metal 1, then the improved product would be in accordance with the teachings of the present invention, and its performance would be improved in accordance with these teachings.

Figure 9:
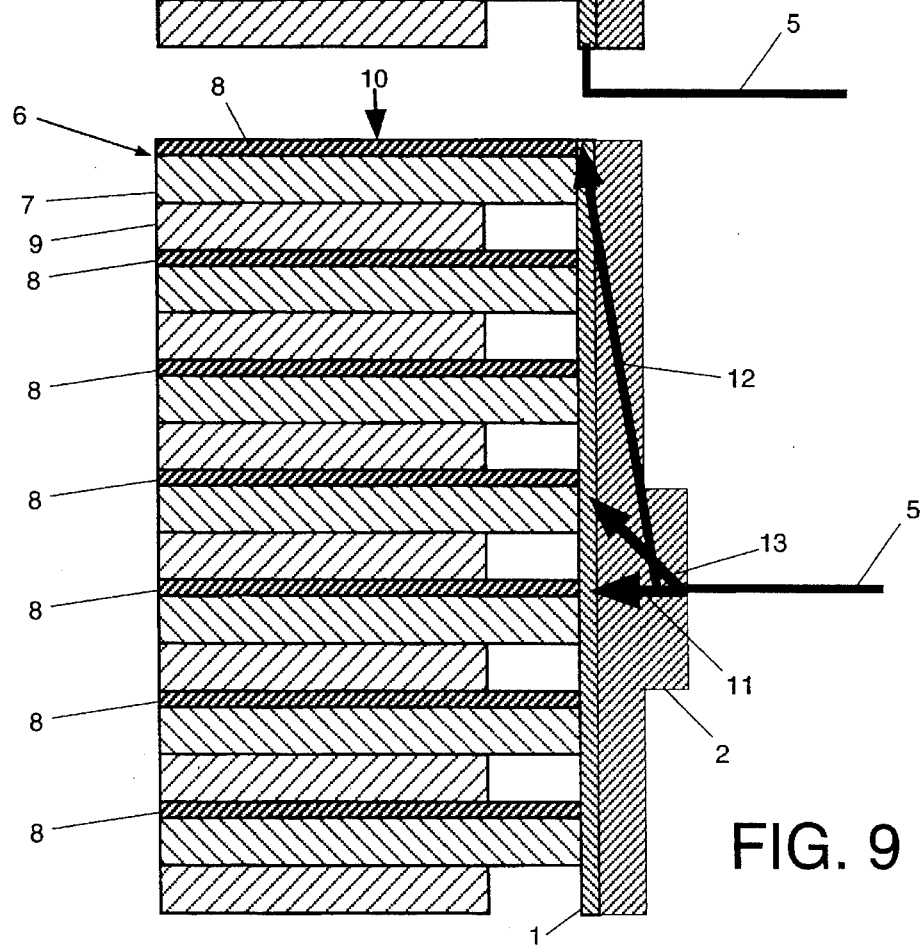

FIG. 9 shows that sprayed metal 1 and/or 2 could be non-uniform over the face of electrical component 10, and could have any shape. FIG. 9 is similar to FIGS. 4–5, and shows paths 11, 12, and 13. In the FIG. 9 example, sprayed metal 2 is thicker in the region between paths 11 and 13 than it is in the region between paths 13 and 12. As discussed above, the considerations, for the advantageous thickness of sprayed metal 2 relative to sprayed metal 1, differ for paths similar to path 11 than for paths similar to path 12, with path 13 marking the transition point between the two differing considerations. Typically, the considerations for path 11 would require a greater thickness for sprayed metal 2 relative to sprayed metal 1 than the considerations for path 12 would. However, it might be disadvantageous to make all of sprayed metal 2 as thick as required just for the small region between paths 11 and 13, since such thickness might discriminate against high frequencies of interest due to skin effect. One solution could be to make sprayed metal 2 thicker only where it is advantageous to do so, in the region around path 11, and then to make it thinner beyond this region. The change from thick to thin could be gradual, or it could be in one or more discrete steps as shown in FIG. 9.

Although the descriptions of preferred embodiments have focussed on molten metals and thermal problems, the present invention is not limited to sprayed metals. The intermediary substructure of the present invention could comprise materials applied in solid rather than molten form, and could comprise materials other than metals. For example, in FIG. 8 the layer called sprayed metal 2 alternatively could simply be a solid piece of metal, applied at room temperature to be adjacent to sprayed metal 1, and thereby furnishing the same advantages as described for sprayed metal 2 in FIG. 8.

The present invention is applicable to single plate capacitors, to multiple stacked plate capacitors, to roll capacitors, etc. The present invention is applicable to metallized film capacitors, film and foil capacitors, and other types of capacitors. The present invention is applicable to resistors and other types of electrical components. The present invention is applicable to electrical components that are heat sensitive and also to those that are not heat sensitive. For example, even if an electrical component is not heat sensitive, it could be advantageous to apply adjacently a material that is similar to the material of the electrical component, for the sake of good adhesion and electrical contact, and then to apply a second material having a higher melting point, hence likely superior electrical characteristics, in sufficient amount so that it electrically predominates.

Any definitions or criteria given in this specification are possible illustrative examples, contributing to the description of some possible embodiments of the present invention. These definitions and criteria do not delimit the present invention, either inclusively or exclusively.

Although the present invention has been described in considerable detail in the above specification, it is not intended that the invention be limited to such detail except as necessitated by the appended claims or their legal equivalent.

I claim:

1. A structure comprising,
   an electrical component,
   and a terminal for making external electrical connections to said electrical component,
   and a substructure for electrically connecting said terminal to said electrical component,
   the improvement comprising the composition of said substructure,
   said composition of said substructure comprising a first material adjacent to said electrical component,
   said composition of said substructure further comprising a second material adjacent to said first material, said second material having a melting point higher than the melting point of said first material,
   said first material being employed in a predetermined first form having a predetermined first amount of material and a predetermined first set of dimensions,
   said second material being employed in a predetermined second form having a predetermined second amount of material and a predetermined second set of dimensions,
   said first amount of material and said first set of dimensions being related to said second amount of material and said second set of dimensions
   such that a first electrical resistance, through said second form employing said second material, for a given length in at least one first direction, is less than a second electrical resistance, through said first form employing said first material, for said given length in said first direction.

2. The structure of claim 1 where said first electrical resistance is less than half said second electrical resistance.

3. The structure of claim 1 having a first thickness of said first material in a second direction substantially perpendicular to a third direction of an electrical current and having a second thickness of said second material in said second direction, wherein a first ratio of said first thickness to said second thickness is less than a second ratio of the resistivity of said first material to the resistivity of said second material.

4. The structure of claim 1 having a first thickness of said first material in a second direction substantially perpendicular to a third direction of an electrical current and having a second thickness of said second material in said second direction, wherein a first ratio of said first thickness to said second thickness is less than the inverse of a second ratio of the resistivity of said first material to the resistivity of said second material.

5. The structure of claim 1 wherein said second material has a resistivity no greater than aluminum.

6. The structure of claim 1 wherein said second material is adjacent to said terminal.

7. The structure of claim 1 wherein said electrical component is a capacitor.

8. The structure of claim 1 wherein said first material is substantially the same material as the material within said electrical component to which said first material is adjacent.

9. The structure of claim 1 wherein said first material has a similar or complementary molecular structure as the material within said electrical component to which said first material is adjacent.

10. The structure of claim 1 wherein said first material has a similar or complementary atomic structure as the material within said electrical component to which said first material is adjacent.

11. A method for providing improved electrical performance in the connection of an electrical component to its terminal,
    said method comprising the step of providing a first material adjacent to said electrical component,
    and the step of providing a second material adjacent to said first material, said second material having a melting point higher than the melting point of said first material,
    said first material being employed in a predetermined first form having a predetermined first amount of material and a predetermined first set of dimensions,
    said second material being employed in a predetermined second form having a predetermined second amount of material and a predetermined second set of dimensions,
    said first amount of material and said first set of dimensions being related to said second amount of material and said second set of dimensions
    such that a first electrical resistance, through said second form employing said second material, for a given length in at least one first direction, is less than a second electrical resistance, through said first form employing said first material, for said given length in said first direction.

12. The method of claim 11 where said first electrical resistance is less than half said second electrical resistance.

13. The method of claim 11 having a first thickness of said first material in a second direction substantially perpendicular to a third direction of an electrical current and having a second thickness of said second material in said second direction, wherein a first ratio of said first thickness to said second thickness is less than a second ratio of the resistivity of said first material to the resistivity of said second material.

14. The method of claim 11 having a first thickness of said first material in a second direction substantially perpendicular to a third direction of an electrical current and having a second thickness of said second material in said second direction, wherein a first ratio of said first thickness to said second thickness is less than the inverse of a second ratio of the resistivity of said first material to the resistivity of said second material.

15. The method of claim 11 wherein said second material has a resistivity no greater than aluminum.

16. The method of claim 11 wherein said second material is adjacent to said terminal.

17. The method of claim 11 wherein said electrical component is a capacitor.

18. The method of claim 11 wherein said first material is substantially the same material as the material within said electrical component to which said first material is adjacent.

19. The method of claim 11 wherein said first material has a similar or complementary molecular structure as the material within said electrical component to which said first material is adjacent.

20. The method of claim 11 wherein said first material has a similar or complementary atomic structure as the material within said electrical component to which said first material is adjacent.

* * * * *